(12) United States Patent  (10) Patent No.: US 8,925,953 B2
Algüera  (45) Date of Patent: Jan. 6, 2015

(54) BEARING ASSEMBLY OF A FIFTH WHEEL COUPLING

(75) Inventor: José Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 46 days.

(21) Appl. No.: 13/814,948

(22) PCT Filed: Aug. 18, 2011

(86) PCT No.: PCT/EP2011/064245
§ 371 (c)(1),
(2), (4) Date: Feb. 8, 2013

(87) PCT Pub. No.: WO2012/022789
PCT Pub. Date: Feb. 23, 2012

(65) Prior Publication Data
US 2013/0168946 A1    Jul. 4, 2013

(30) Foreign Application Priority Data
Aug. 20, 2010   (DE) .......................... 10 2010 039 578

(51) Int. Cl.
*B62D 53/08* (2006.01)

(52) U.S. Cl.
CPC .................................... *B62D 53/08* (2013.01)
USPC ..................... 280/433; 280/438.1; 280/407.1; D12/161; D12/162

(58) Field of Classification Search
USPC ............ 280/433, 438.1, 407.1; D12/161, 162
See application file for complete search history.

(56) References Cited

U.S. PATENT DOCUMENTS 4,762,334 A * 8/1988 Altherr .......................... 280/433
5,368,324 A * 11/1994 Kaim .......................... 280/438.1

FOREIGN PATENT DOCUMENTS

| DE | 10 2006 007 129 A1 | 8/2007 |
| EP | 0 694 467 A2 | 1/1996 |
| EP | 1 233 901 B1 | 7/2004 |
| WO | 01 34454 A1 | 5/2001 |

\* cited by examiner

*Primary Examiner* — Joseph Rocca
*Assistant Examiner* — Marlon Arce
(74) *Attorney, Agent, or Firm* — Hudak, Shunk & Farine Co. LPA

(57) ABSTRACT

A bearing assembly having a bearing block of a fifth wheel coupling. The bearing block has at least one vertical fastening flange. The tractive unit has a frame element, which has a vertical section. The vertical fastening flange is connected to the outside of the vertical section by a screw connection. A component, on which the vertical fastening flange is supported at least in the vertical direction, is fastened to the vertical section.

18 Claims, 6 Drawing Sheets

BEARING ASSEMBLY OF A FIFTH WHEEL COUPLING

FIELD OF INVENTION

The invention concerns a bearing assembly with a bearing block of a fifth wheel coupling with a frame element of a tractor vehicle, wherein the frame element has a vertical section and with a screw connection by which the vertical fastening flange is connected to an outer side of the vertical section.

BACKGROUND OF THE INVENTION

The fifth wheel coupling of tractor vehicles are pivot-mounted in two bearing blocks that are fastened to the two parallel elements of the frame of the tractor vehicle. The forces exerted by the coupled trailer with vertical and horizontal components are absorbed via the fifth wheel coupling on the bearing blocks, from which they are passed on to the frame elements. The fastening of the bearing block is subjected to a substantial strain in this case.

Vehicle designs are known that have been developed with the goal of a low overall weight, the bearing blocks of the fifth wheel coupling being screwed directly on the frame elements of the vehicle and joined together by cross arms, depending on the application. The screw fastening takes on the transmission of the operating forces of the fifth wheel coupling to the vehicle frame, both in the vertical direction and in that transverse to the direction of travel. For this reason, the screw fastening is correspondingly heavily strained. Therefore, one must use high-quality screws in sufficient numbers.

Beneath the bearing block other structural parts or chassis components are generally mounted, such as the stabilizer arm of the stabilizer mechanism of the rear axle of the tractor vehicle.

EP 1 233 901 B1 describes a coupling assembly for mounting on a tractor vehicle, wherein the bearing blocks have a fastening flange extending in the vertical direction, which is connected to the outside of a vertical section of the respective frame element. This involves a screw connection, in which the screws are arranged horizontally. The vertical force components that are applied act as shear forces on the screws perpendicular to their lengthwise axis, and accordingly the screws must be designed to be stable and of high quality.

Bearing blocks are known from EP 0 694 467 A2 that have a fastening flange extending in the horizontal direction, which is connected to an L-shaped auxiliary frame screwed onto the outside of the vertical section of the frame element. This auxiliary frame is likewise fastened by means of a screw connection to the vertical section of the frame element, and the same shear forces act on this screw connection as in the arrangement of EP 1 233 901 B1.

To avoid shear forces on the screw connection of the fastening flange with the horizontal leg of the L-shaped auxiliary frame, the boreholes through which the screws pass are fashioned with so large a cross section that the screws are overly accommodated in them. This is supposed to ensure that this screw connection only needs to absorb vertical tensile forces and thus is basically subjected to no shear forces. However, these vertical tensile forces are passed on to the screw connection of auxiliary frame and frame element.

In order to prevent the tensile and thrust forces arising during operation of the fifth-wheel coupling from acting as shear forces on the screw connection, thrust plates can be screwed onto the parts of the auxiliary frame in front of and behind the bearing blocks in the direction of travel. These thrust plates lie with bearing surfaces against abutment surfaces of the bearing block in form-fitting manner, in order to absorb the forces transmitted by the latter.

According to another configuration, the parts of the auxiliary frame can fashioned as one piece with the bearing block.

SUMMARY OF THE INVENTION

The problem of the invention is to provide a simple and therefore economical design for the screw connection of bearing block and frame element.

This problem is solved with a bearing assembly with a bearing block of a fifth wheel coupling, with a frame element of a tractor vehicle, wherein the frame element has a vertical section and with a screw connection by which the vertical fastening flange is connected to an outer side of the vertical section, wherein a structural part is fastened to the vertical section against which the vertical fastening flange is braced in at least the vertical direction.

The bearing assembly is characterized in that a structural part is fastened to the vertical section against which the vertical fastening flange is braced in at least the vertical direction.

Due to the fact that a bracing of the vertical fastening flange occurs against an additional or already existing structural part, arranged on the frame element of the tractor vehicle, the screw connection is relieved of some of the applied forces, especially the vertical forces. This has the advantage that technically elaborate and high quality screws do not have to be used in large numbers. The bearing fastening, where nothing has been changed in regard to installation expense, can thus be more economical in design. Neither does the bearing block itself have to be changed for this.

The structural part can preferably be welded or screwed on. In the simplest case, the structural part can be a vertically positioned plate or a cleat against which the vertical fastening flange is braced.

An especially preferred embodiment consists in using a structural part for the bracing that is already fastened to the frame element for another purpose of use. Preferably, the component is a stabilizer arm of a stabilization mechanism of the vehicle axle. Due to the fact that the stabilizer arm is likewise fastened to the vertical section of the frame element in the area of the fifth wheel coupling, this stabilizer arm can be used for the bracing. The vertical extent of the vertical fastening flange and stabilizer arm should be adapted to each other, so that the bracing can occur.

This embodiment has the advantage that no additional structural part needs to be put in place, thereby reducing the overall weight of the tractor vehicle.

A strengthening of the fastening, especially the screw fastening of the stabilizer arm to the frame element, is not required, since the vertical forces introduced in the stabilizer arm by the weight of the trailer are directed opposite the dynamic forces introduced by the axle of the vehicle. Therefore, the forces introduced at least partly cancel out.

Preferably, the structural part fastened to the vertical section underneath the vertical fastening flange.

The lower end surface of the vertical fastening flange lies preferably against the upper end surface of the structural part.

The two end surfaces lying on or against each other can be the same size or different size. Fastening flange and structural part can be arranged in the same position in the lengthwise direction of the frame element or also be staggered relative to each other. If, for example, the structural part has a larger lengthwise dimension than the fastening flange, the bearing block can be moved in the lengthwise direction, so that a given overall vehicle length can be achieved for a tractor/trailer combination.

Preferably, the vertical fastening flange has at least one horizontal flange on its outer surface, which likewise bears against the end surface of the structural part. Such a horizontal flange is preferably molded on the fastening flange.

For corresponding thickness of the structural part, the bearing surface, i.e., the common contact surface of the two end surfaces, will be enlarged. This also opens up the possibility of providing an additional connection, especially a screw connection of structural part and vertical fastening flange or horizontal flange in the area of the end surfaces.

The horizontal flange is preferably arranged at the lower end of the vertical fastening flange and this is flush with the end surface of the fastening flange.

According to another embodiment, the horizontal flange can also be staggered upward. In this case, the upper end surface of the structural part preferably has a corresponding step. Such a step has the advantage that an additional fixation, especially a form-fitting fixation of the bearing block can be achieved in the transverse direction, i.e., perpendicular to the lengthwise direction of the frame element.

Preferably, the structural part or the vertical fastening flange has a recess, which at least partly receives the vertical fastening flange or the structural part. Thanks to the recess, two upwardly projecting legs are fashioned on both sides of the structural part or downwardly projecting legs on the vertical fastening flange, so that a bracing of the vertical fastening flange or the structural part in the direction of travel or against the direction of travel, i.e., the lengthwise direction of the frame element, can be achieved.

Preferably, the lengthwise dimension of the recess in the lengthwise direction of the frame element is ≥ the lengthwise dimension of the fastening flange or the structural part. In this way, the bearing block can be shifted relative to the structural part, e.g., to adjust the overall length of the vehicle.

Preferably the vertical fastening flange is joined by form-fitting to the structural part. In this way, operating forces in the direction of travel and transversely to it can be absorbed.

One embodiment calls for the upper end surface of the structural part to have a that profiling and the lower end surface of the fastening flange to have a second, complementary profiling. Such a profiling can be configured, for example, by projections, ribs and/or grooves.

This profiling is especially advantageous when, e.g., the recess is larger than the particular component installed, i.e., fastening flange or structural part, and a fixation is to be done in the lengthwise direction.

BRIEF DESCRIPTION OF THE DRAWINGS

Sample embodiments of the invention are explained more closely hereafter by means of the drawings.

There are shown.

DETAILED DESCRIPTION OF THE INVENTION

Figure 1:
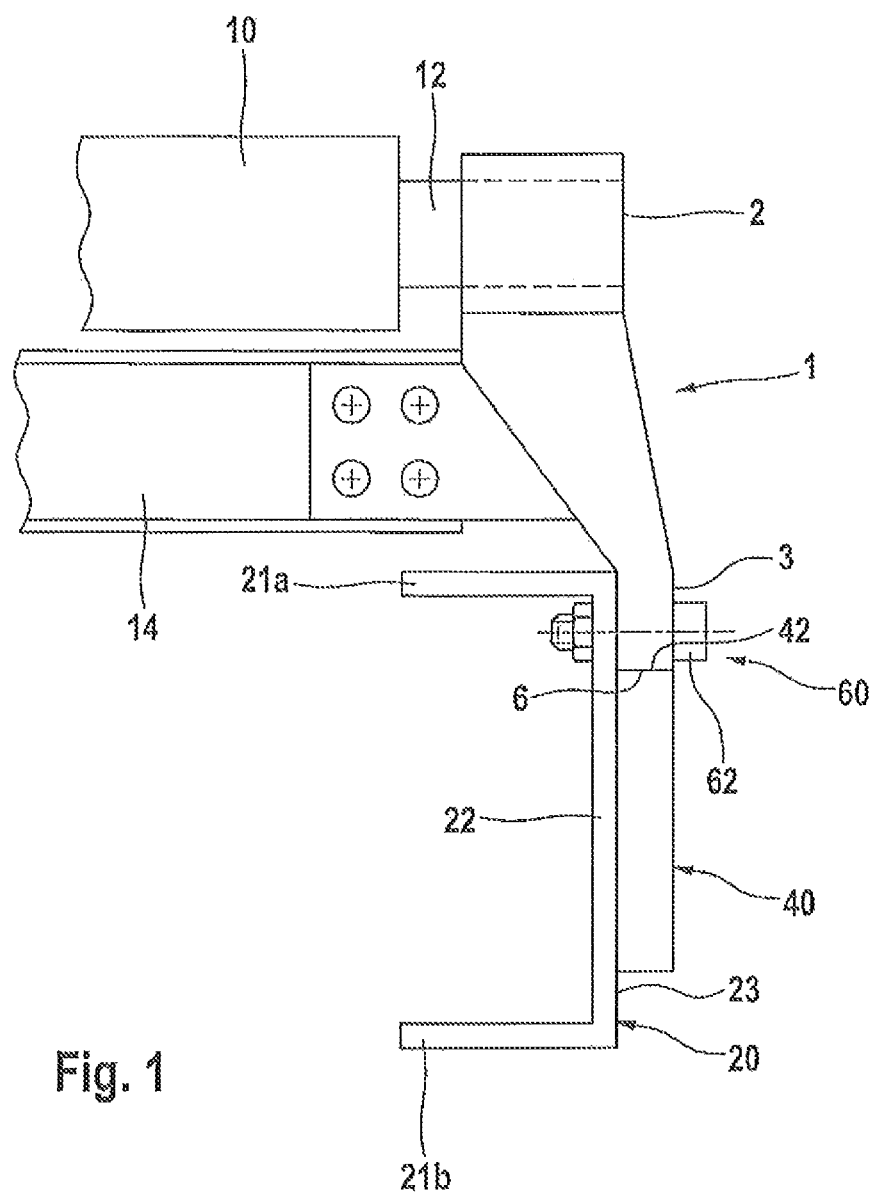
FIG. 1, a schematic representation of the bearing assembly in a section view perpendicular to the lengthwise axis of the frame element, FIG. 2, a side view of the embodiment shown in FIG. 1, FIG. 3, a section view through a bearing assembly according to another embodiment, FIG. 4, a side view of a bearing assembly according to another embodiment.

FIG. 1 shows a bearing assembly in a section perpendicular to the direction of travel, i.e., perpendicular to the lengthwise axis of a frame element 20. The frame element 20 is configured as a C-profile and has two horizontal legs 21a, b, as well as a vertical section 22 joining the legs 21a, b.

Figure 2:
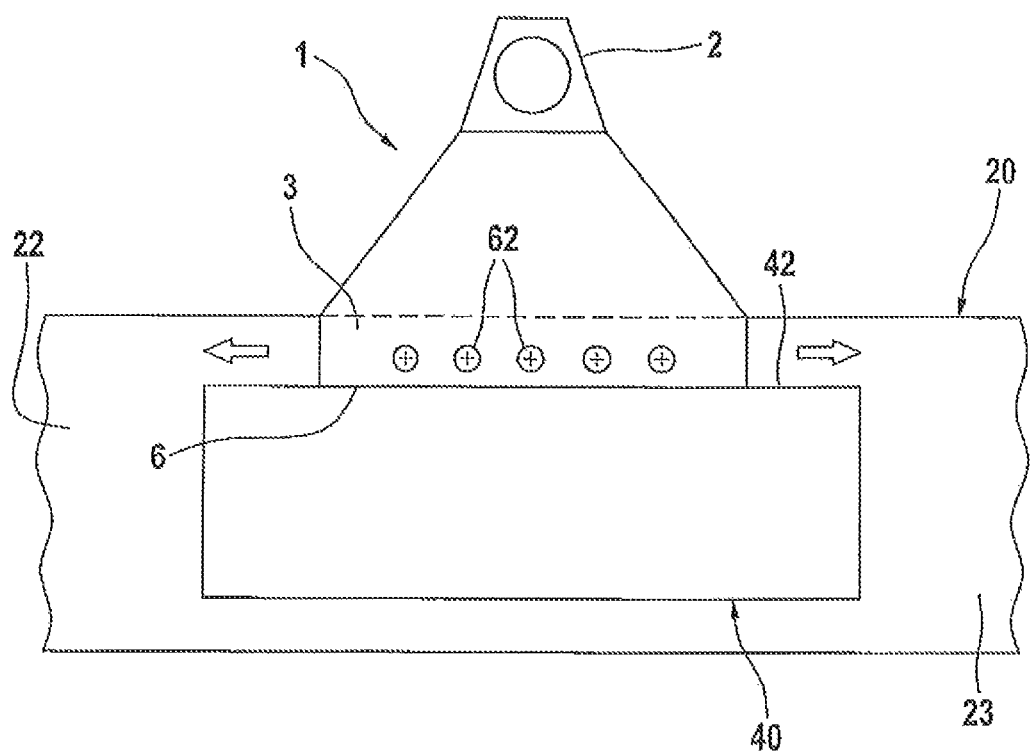

A structural part 40 is fastened to the outer surface 23 of the vertical section 22 of the frame element 20, which can be a vertically arranged plate, for example—as shown in FIG. 2.

On top of the frame element 20 is disposed a bearing block 1 having at the upper end a bearing seat 2, for example, one in the form of a bearing bushing, and at the lower end a vertical fastening flange 3. In the bearing seat 2 there is located a bearing bolt 12 of a fifth wheel coupling 10, shown only schematically and in part.

The vertical fastening flange 3 of the bearing block 1 is fastened by means of a screw connection 60 with screws 62 to the vertical section 22 of the frame element 20. The vertical fastening flange 3 has a lower end surface 6, which sits on the upper end surface 42 of the structural part 40. In this way, the vertical fastening flange 3 is braced against the structural part 40.

The vertical forces introduced into the bearing block 1 from the fifth wheel coupling 10 are at least partly absorbed by the structural part 40, so that the shear forces acting on the screws 42 are lessened. Therefore, traditional screws 62 can be used, instead of costly, high-quality special screws.

The frame element 20 is part of the vehicle frame or chassis and is likewise present at the opposite side of the vehicle. Since the fifth wheel coupling 16 is pivot-mounted in such a bearing block 1 on both sides, this bearing assembly also exists on the opposite side (not shown). The two bearing blocks 1 are additionally joined together by means of a cross arm 14.

FIG. 2 shows a side view of the bearing assembly shown in FIG. 1. The structural part 40 is configured as a plate, while the lengthwise dimension of the structural part 40 is larger than the lengthwise dimension of the bearing block 1 or its vertical fastening flange 3. It is therefore possible to move the bearing block 1 in the two arrow directions and fasten it to the frame element 20 in a desired position, ensuring the bracing against the structural part 40 in the various positions. The upper end surface 42 in this embodiment is larger than the lower end surface 6 of the vertical fastening flange 3.

Figure 3:
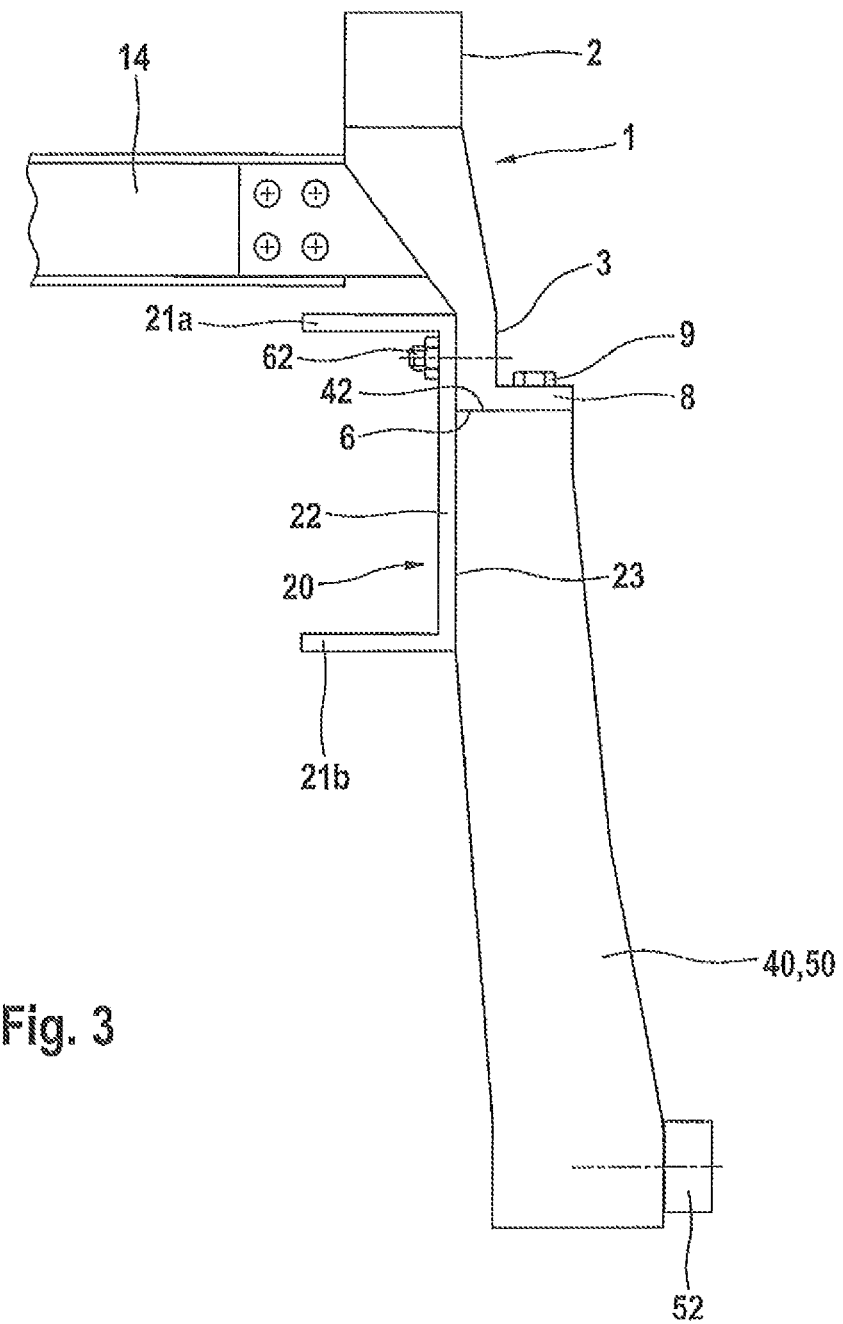

FIG. 3 shows another embodiment. While the structural part 40 in FIGS. 1 and 2 can be an additionally mounted part, which can be welded or screwed on, for example, the structural part 40 shown in FIG. 3 is a stabilizer arm 50 of a stabilization mechanism of the vehicle axle (not shown). At the lower end of the stabilizer arm 50, a pivoting connecting rod 52 is arranged. No further details of the stabilization mechanism are shown.

Figure 4:
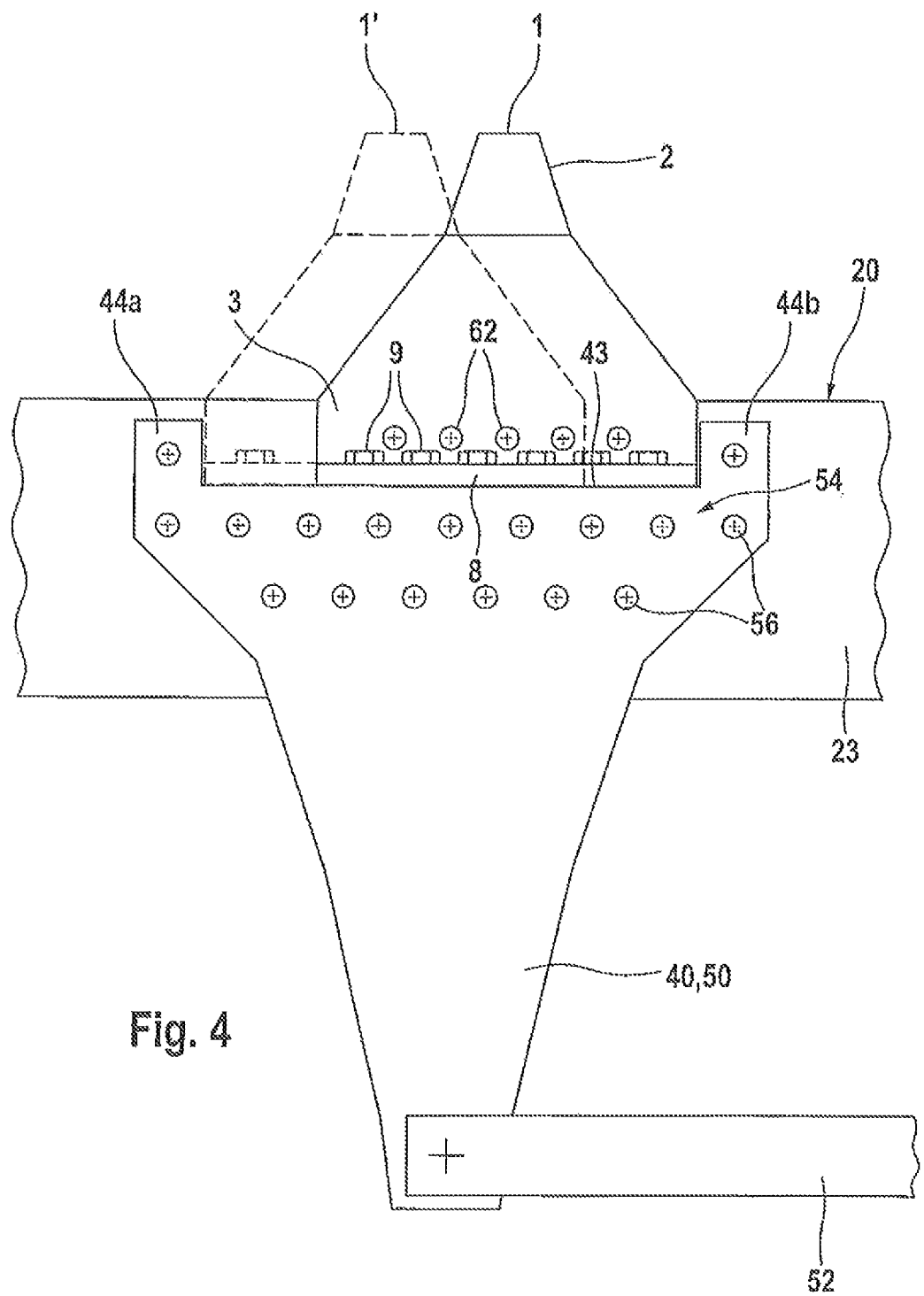

The stabilizer arm 50, as shown for example in FIG. 4, is fastened by means of a screw connection 54 with screws 56 to the outer side 23 of the vertical section 22 of the frame element 20.

As is shown in FIG. 3, the stabilizer arm 50 is thicker than the vertical fastening flange 3. This has a horizontal flange 8 at the lower end, which is adapted to the thickness of the stabilizer arm 50. In this way, the lower end surface 6 of the vertical fastening flange 3 is enlarged and adapted to the upper end surface 42 of the structural part 40 or the stabilizer arm 50. This enables an additional connection of fastening flange 3 and stabilizer arm 50 by means of the perpendicular positioned screws 9, which engage with the horizontal flange 8.

FIG. 4 shows another embodiment in which the stabilizer arm 50 has a recess 43. This recess is located on the upper end of the stabilizer arm, so that a U-shaped configuration is produced, with the two projecting logs 44a and 44b bounding the recess 43. In the embodiment shown here, the lengthwise dimension of the recess is larger than the lengthwise dimension of the vertical fastening flange 30, so that the bearing block can be positioned at various positions within the recess 43. A different position of the bearing block is indicated by the broken-line embodiment 1'. The two bearing blocks 1 and 1' lie either against the leg 44a or the leg 44b, so that an additional bracing in the direction of travel or opposite to it is achieved.

Figure 5:
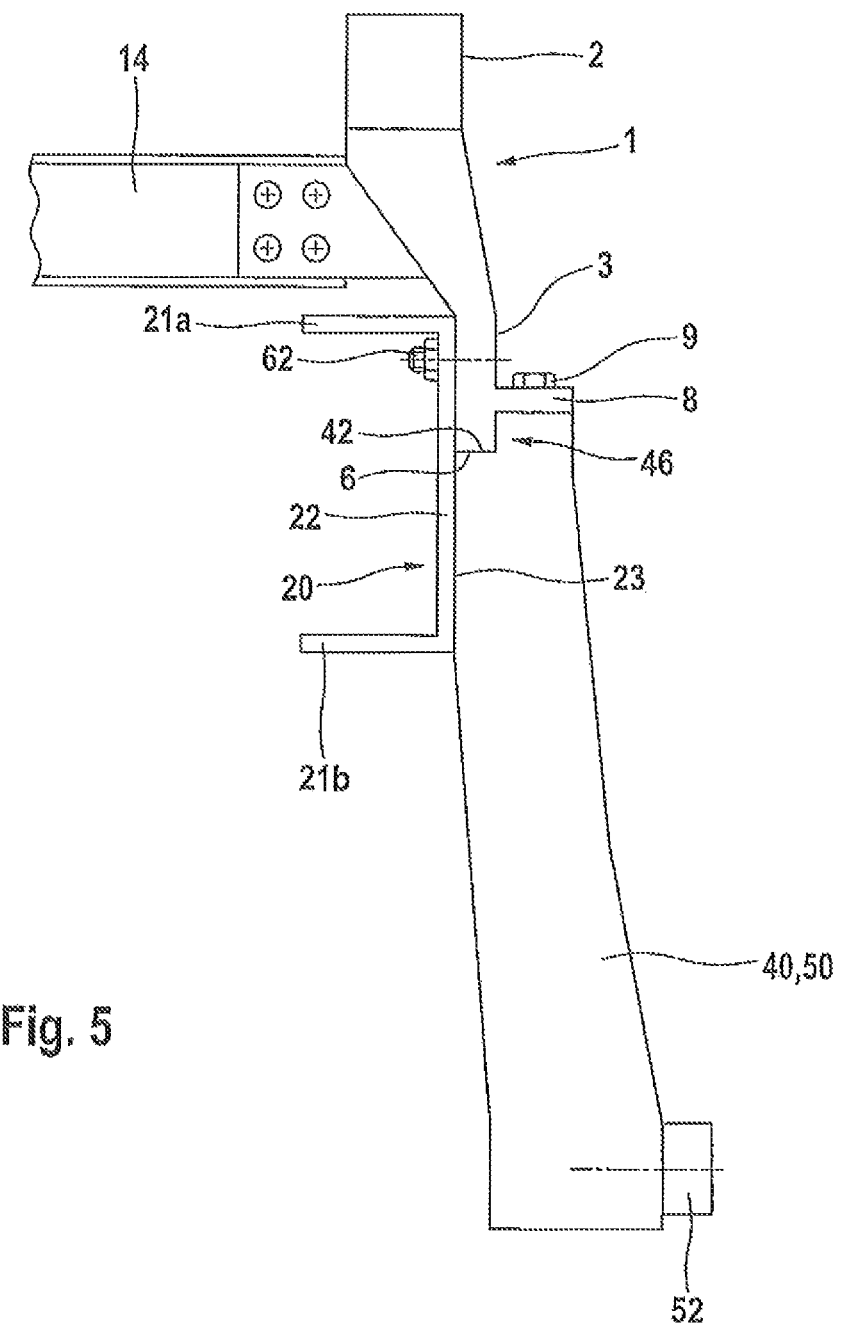
FIG. 5, a section view through a bearing assembly according to another embodiment, and FIG. 5, a side view of a bearing assembly according to another embodiment.

FIG. 5 shows another embodiment in which the horizontal flange 8 is staggered upward relative to the lower end surface 6 of the fastening flange 3. Here as well, an additional fixation by means of the screws 9 is provided. Thanks to this staggering of the horizontal flange 8, the upper end surface 42 of the stabilizer arm 50 has a step 46. The upper end surface 42 has two surface segments in different planes, thereby forming the step 46. The lower segment of the fastening flange 3 thus lies between the step 46 and the outer side 23 of the vertical section 22 of the frame element 20, whereby a fixation in the transverse direction is accomplished, i.e., in the direction perpendicular to the lengthwise dimension of the frame element 20.

Figure 6:
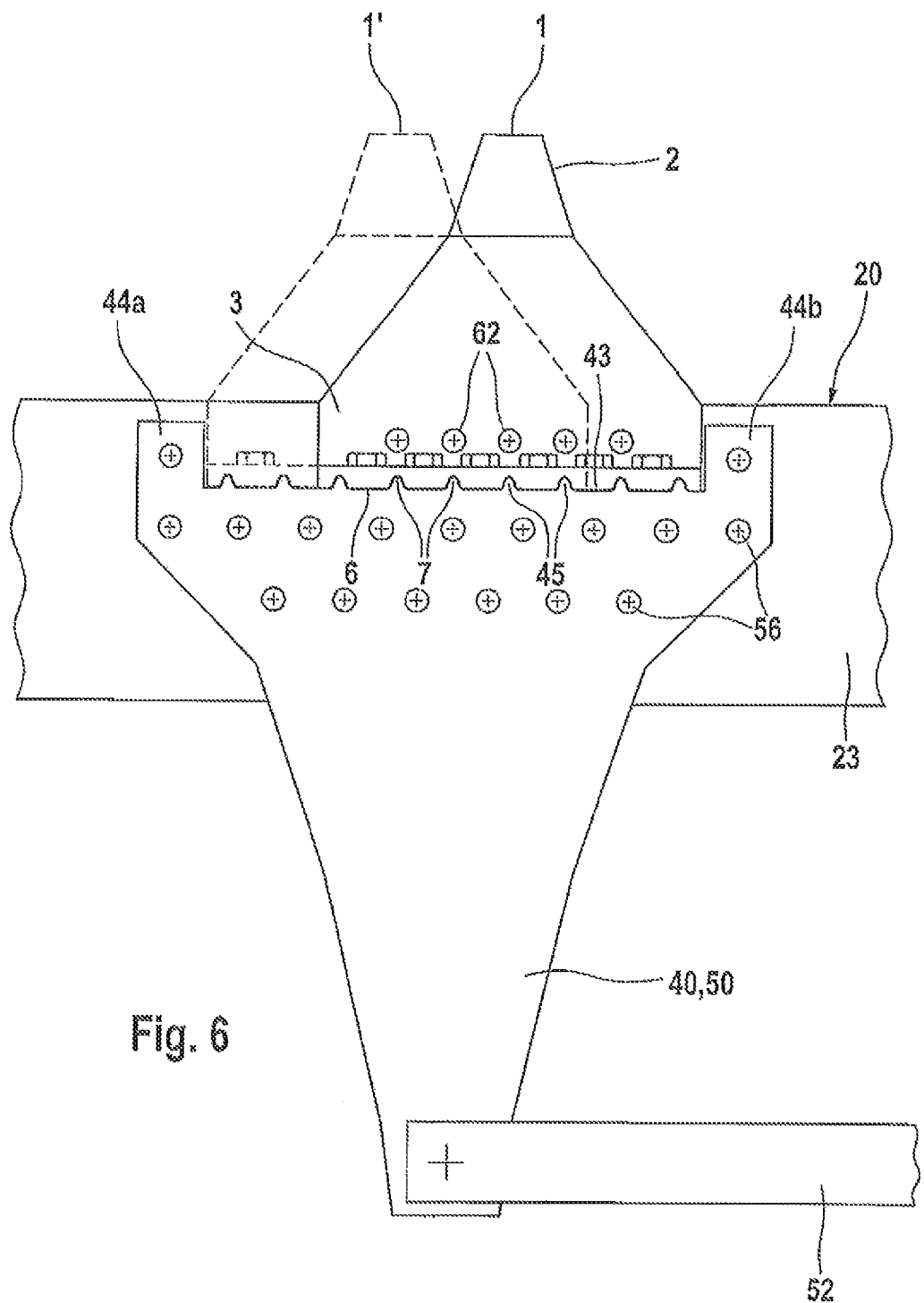

FIG. 6 shows another embodiment, corresponding to the embodiment of FIG. 4, while the upper end surface 42 has a first profiling in the area of the recess 43 of the stabilizer arm 50. This first profiling consists in upwardly projecting ribs 45 that are spaced apart and mate with form fitting in corresponding recesses 7 on the lower end surface 6 of the vertical fastening flange 3. When the bearing block 1 has no contact with the legs 44a and 44b, a fixation in the direction or travel or opposite the direction of travel is accomplished by the interlocking of the two profilings. Such profilings of the end surfaces can also be provided in the embodiment shown in FIG. 2.

LIST OF REFERENCE NUMBERS 1, 1' bearing block
2 bearing seat
3 fastening flange
6 lower end surface
7 recess
8 horizontal flange
9 screw
10 fifth wheel coupling
12 bearing bolt
14 cross arm
20 frame element
21a, b leg
22 vertical section
23 outer side
40 structural part
42 upper end surface
43 recess
44a, b projecting leg
45 rib
46 step
50 stabilizer arm
52 connecting rod
54 screw connection
56 screw
60 screw connection
62 screw

What is claimed is:

1. A bearing assembly, comprising: a bearing block of a fifth wheel coupling, the bearing block having at least a vertical fastening flange,
    with a frame element of a tractor vehicle, wherein the frame element has a vertical section and
    with a screw connection by which the vertical fastening flange is connected to an outer side of the vertical section,
    wherein a structural part is provided that is fastened to the outer side of the vertical section of the frame element against which the vertical fastening flange of the bearing block is braced in at least the vertical direction, wherein a lower end surface of the vertical fastening flange lies against an upper end surface of the structural part.

2. The bearing assembly according to claim 1, wherein the structural part is fastened to the vertical section underneath the vertical fastening flange.

3. The bearing assembly according to claim 1, wherein the vertical fastening flange has at least one horizontal flange on an outer surface, which bears against an upper end surface of the structural part.

4. The bearing assembly according to claim 3, wherein the horizontal flange is arranged at a distance from the end surface of the vertical fastening flange.

5. The bearing assembly according to claim 1, wherein the structural part has a step at its upper end surface.

6. The bearing assembly according to claim 5, wherein the vertical fastening flange is joined to the structural part.

7. The bearing assembly according to claim 1, wherein the structural part or the vertical fastening flange has a recess, which at least partly receives the vertical fastening flange or the structural part.

8. The bearing assembly according to claim 7, wherein a lengthwise dimension of the recess in a lengthwise direction of the frame element is a lengthwise dimension of the fastening flange or the structural part.

9. The bearing assembly according to claim 1, wherein the vertical fastening flange and the structural part are joined together by form-fitting.

10. The bearing assembly according to claim 1, wherein the upper end surface of the structural part has a first profiling and the lower end surface of the fastening flange has a second, complementary profiling.

11. The bearing assembly according to claim 1, wherein the structural part is a stabilizer arm.

12. The bearing assembly according to claim 2, wherein the vertical fastening flange has at least one horizontal flange on an outer surface, which bears against an upper end surface of the structural part.

13. The bearing assembly according to claim 12, wherein the horizontal flange is arranged at a distance from the end surface of the vertical fastening flange.

14. The bearing assembly according to claim 13, wherein the structural part has a step at its upper end surface.

15. The bearing assembly according to claim 14, wherein the vertical fastening flange is joined to the structural part.

16. The bearing assembly according to claim 15, wherein the structural part or the vertical fastening flange has a recess, which at least partly receives the vertical fastening flange or the structural part, wherein a lengthwise dimension of the recess in a lengthwise direction of the frame element is ≥a lengthwise dimension of the fastening flange or the structural part.

17. The bearing assembly according to claim 16, wherein the vertical fastening flange and the structural part are joined together by form-fitting, wherein the upper end surface of the structural part has a first profiling and the lower end surface of the fastening flange has a second, complementary profiling.

18. The bearing assembly according to claim 17, wherein the structural part is a stabilizer arm.

* * * * *

UNITED STATES PATENT AND TRADEMARK OFFICE
CERTIFICATE OF CORRECTION

PATENT NO. : 8,925,953 B2  
APPLICATION NO. : 13/814948  
DATED : January 6, 2015  
INVENTOR(S) : Jose Alguera It is certified that error appears in the above-identified patent and that said Letters Patent is hereby corrected as shown below:

In the Claims,

In claim 8, column 6, line 39: Replace "frame element is a lengthwise" with --frame element is ≥ a lengthwise--

Signed and Sealed this
Twenty-sixth Day of May, 2015

Michelle K. Lee
*Director of the United States Patent and Trademark Office*